(12) United States Patent
Mori

(10) Patent No.: US 6,345,762 B1
(45) Date of Patent: Feb. 12, 2002

(54) AUTOMATIC VENDING MACHINE

(75) Inventor: Hisanao Mori, Mie (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/667,593

(22) Filed: Sep. 22, 2000

(30) Foreign Application Priority Data

Sep. 28, 1999 (JP) .......................................... 11-274426
Jan. 7, 2000 (JP) ...................................... 2000-001618

(51) Int. Cl.[7] .............................................. G06F 7/08
(52) U.S. Cl. ...................................... 235/381; 235/492
(58) Field of Search ............................... 235/384, 492, 235/381; 705/26

(56) References Cited

U.S. PATENT DOCUMENTS 5,382,781 A * 1/1995 Inoue .......................... 235/384
5,845,262 A * 12/1998 Nozue ......................... 235/384

* cited by examiner

Primary Examiner—Harold I. Pitts
(74) Attorney, Agent, or Firm—Kanesaka & Takeuchi

(57) ABSTRACT

An automatic vending machine is formed of a commodity-selecting device for selecting a commodity to be purchased, a device for paying money required to purchase the commodity, a commodity-transfer device for transferring the selected commodity, and a main control section. The machine further includes one antenna section for communication by electric wave, a device for activating a non-contact IC card, a device for activating a mode showing the balance of the card, and a balance display in order to allow commodities to be purchased by using the non-contact IC card. Thus, in the automatic vending machine, a user can select the commodity and then settle the account simply by holding the non-contact IC card to one section of the automatic vending machine just once.

7 Claims, 4 Drawing Sheets

AUTOMATIC VENDING MACHINE

BACKGROUND OF THE INVENTION AND RELATED ART STATEMENT

The present invention relates to an automatic vending machine corresponding to an electronic money system using a non-contact IC card available in, for example, transportation systems. Such a non-contact IC card has no built-in battery, and is operated through a power supply by electric wave, so it is environmentally sound and have a desired shape. In a transportation field, a method of specifying a destination and then holding the card to an antenna section to settle the account has been employed. In addition, electronic money in the transportation systems is expected to be used for shopping.

Automatic vending machines were initially invented for single-price commodities and subsequently developed for multiple-price commodities. Thus, an operation method starting with inputting of cash is used for all automatic vending machines. When a user first inputs coins or bills, a sale enabling lamp in a commodity selection button section lights up depending on the amount of money input. The lighting commodity selection button is then operated to transfer a corresponding commodity. In addition, as conventional card-compatible automatic vending machines, cards with contact type are generally used, so that a card insertion method is employed.

A first problem with a structure of a prepaid settlement card system utilizing non-contact IC cards is when a power is supplied to the card. In an automated ticket gate, it is installed in a limited site within a station yard and most of people passing through the automated ticket gate intend to use a train, so that an electric wave for a power supply is always output. Since, however, automatic vending machines are installed in various sites where people can purchase commodities easily, there is a demand for an automatic vending machine that a power-supplying electric wave is provided when a person for purchasing a commodity or goods stands in front of the machine and the commodity is surely supplied by reliably performing a commodity selecting operation.

In addition, when a card is repeatedly provided to the machine, a user may fear that a corresponding amount is being subtracted from the card multiple times. As a result, users may become hesitant about using the card. Furthermore, since the non-contact IC card is widely available as electronic money, crimes, such as theft, forgery or alteration may occur, requiring the development of secure automatic vending machines. Moreover, since the non-contact IC card will not become widespread immediately, an automatic vending machine is desired to be operated both by cash or contact cards as in the prior art, and by the no-contact cards.

As a prior art, there is a control method for subtracting a fixed amount from an IC card when an automatic vending machine deals with a single commodity price, and when the automatic vending machine deals with multiple commodities with different prices, the amount of money contained in the IC card is transferred to a main control section of the automatic vending machine in such a manner as to temporarily deposit the money, so that the IC card is settled after the commodity has been ejected (Japanese Patent Application Laid Open (KOKAI) No. 6-176251). If an attempt is made to apply this control method to the non-contact IC card settled by holding it to the machine, the card must be held up to the machine twice in the case of multiple commodity prices, that is, before and after selection of the commodity. As a result, users may reject the use of the card. Additionally, since the amount of money in the card is transmitted to the main control section of the automatic vending machine and subsequently returned to the card for settlement, a security problem, i.e. data alteration is likely to occur.

Several methods have been proposed to avoid holding the non-contact card up to the machine twice to settle the account. One such method includes providing an antenna for the non-contact cards in a commodity exhibiting section for sale, wherein the commodity selection and card settlement are simultaneously carried out when the card is held to the antenna (Japanese Patent Application Laid Open (KOKAI) No. 10-198847). This control method does not handle both non-contact cards and cashes, and requires the antenna section for each of the commodities to be sold, resulting in a complicated structure and high costs. Although holding the card to the commodity exhibiting section is advantageous to users when a small number of commodities are arranged with large spaces and sold, this operation is difficult for modern automatic vending machines, which have a large number of commodities and the arrangement of the commodities can be freely set.

As another conventional method, there is automatic vending machine usage-detecting means for detecting the presence of a user, transmitting a provisional payment signal to the main control section having an amount of money set therein that is equal to or larger than the highest selling price of the commodities to be sold, in order to enable selection of a commodity, and subtracting the selling price from the card when the card is held to a reader writer after the commodity has been selected (Japanese Patent Application Laid Open (KOKAI) No. 10-232965). With this control system, it is difficult to handle the "provisional signal" thereby requiring a complicated structure for the main control section, and the automatic vending machine is activated whenever any person, consumer or otherwise, simple stands in front of the machine. It is contemplated that the above-described problems may be solved by using an insertion card reader, but this eliminates the advantages of the non-contact card.

It is an object of the present invention to provide an automatic vending machine that can be used by users with non-contact cards available for traffic or transportation systems with the same level of ease in using an automated ticket gate, and that can also be used by cash users, wherein in the automatic vending machine, the user can select a commodity and settle the account by simple holding a non-contact IC card once to one section of the machine.

It is another object of the present invention to provide an automatic vending machine that does not require a number of antennas to be increased or reduced depending on whether the machine will handle multiple commodity prices or a single commodity price, and that is actuated only when a person for purchasing a commodity operates the machine.

It is yet another object of the present invention to provide a control device for an automatic vending machine that requires a minimum amount of signals, that is, only amount data to be transmitted to and from a main control section in order to prevent the alteration and forgery of data, and that can be implemented without the need to substantially change an existing automatic vending machine control device.

SUMMARY OF THE INVENTION

To attain the above objects, according to the present invention, an automatic vending machine comprises commodity-selecting means for selecting a commodity to be purchased, means for paying money required to purchase the commodity, commodity-transfer means for transferring the selected commodity, and a main control section. The automatic vending machine includes one antenna section for communication by electric waves, means for activating a non-contact IC card, means for activating a mode for displaying the balance of the card, and a balance display, in order to allow commodities to also be purchased by using the non-contact IC card.

The antenna section, a sale-start button acting as the means for activating the card, a balance-display button acting as the means for activating the mode for displaying the balance of the card, the balance display, and a control section for controlling the components are configured into one card unit, and communication between the card unit and the main control section is controlled by using only a sale-mode-activating signal, selling amount data on a selected commodity, and a sale permission or prohibition signal acting as an operation result signal from the card.

A sale-start button acting as the means for activating the non-contact IC card, a balance-display button acting as the means for activating the mode for displaying the balance of the card, the balance display, and a control section for controlling the components may be configured into a card unit, and the antenna section and a control section therefor are configured into a reader writer. Communication between the card unit and the main control section is controlled by using only a sale-mode-activating signal, selling amount data on a selected commodity, and a sale permission or prohibition signal acting as an operation result signal from the card.

The control section of the card unit is connected to a central computer via a communication interface, and the control section of the card unit has a built-in block for a secure application module acting as an encryption processing section for communication with the non-contact IC card and the central computer device.

Display means for displaying the balance of the card may be provided in the card unit separately from a display section of an automatic vending machine's main body.

The sale-start button and the balance-display button are operated to start supplying power to the non-contact card from the card unit electric waves. The sale-start button is operated to enable both a sequential operation comprising a first operation of commodity selection executed by the commodity-selecting means and a second operation of money payment executed by means for paying money, and a sequential operation comprising a first operation of money payment and a second operation of commodity selection.

DETAILED DESCRIPTION OF PREFERRED EMBODIMENTS

Figure 1:
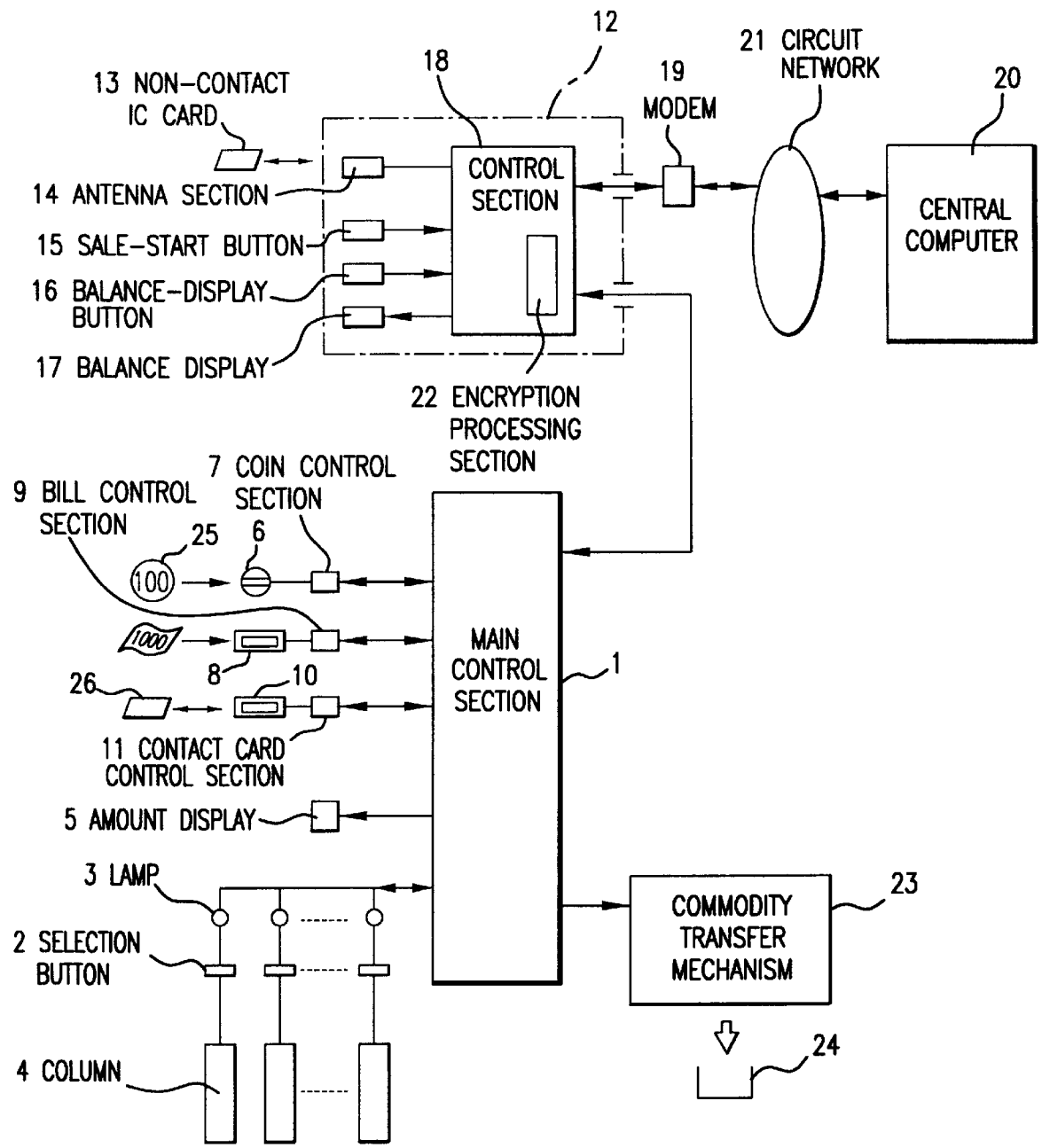
FIG. 1 is a block diagram of an embodiment of the present invention.
Figure 2A:
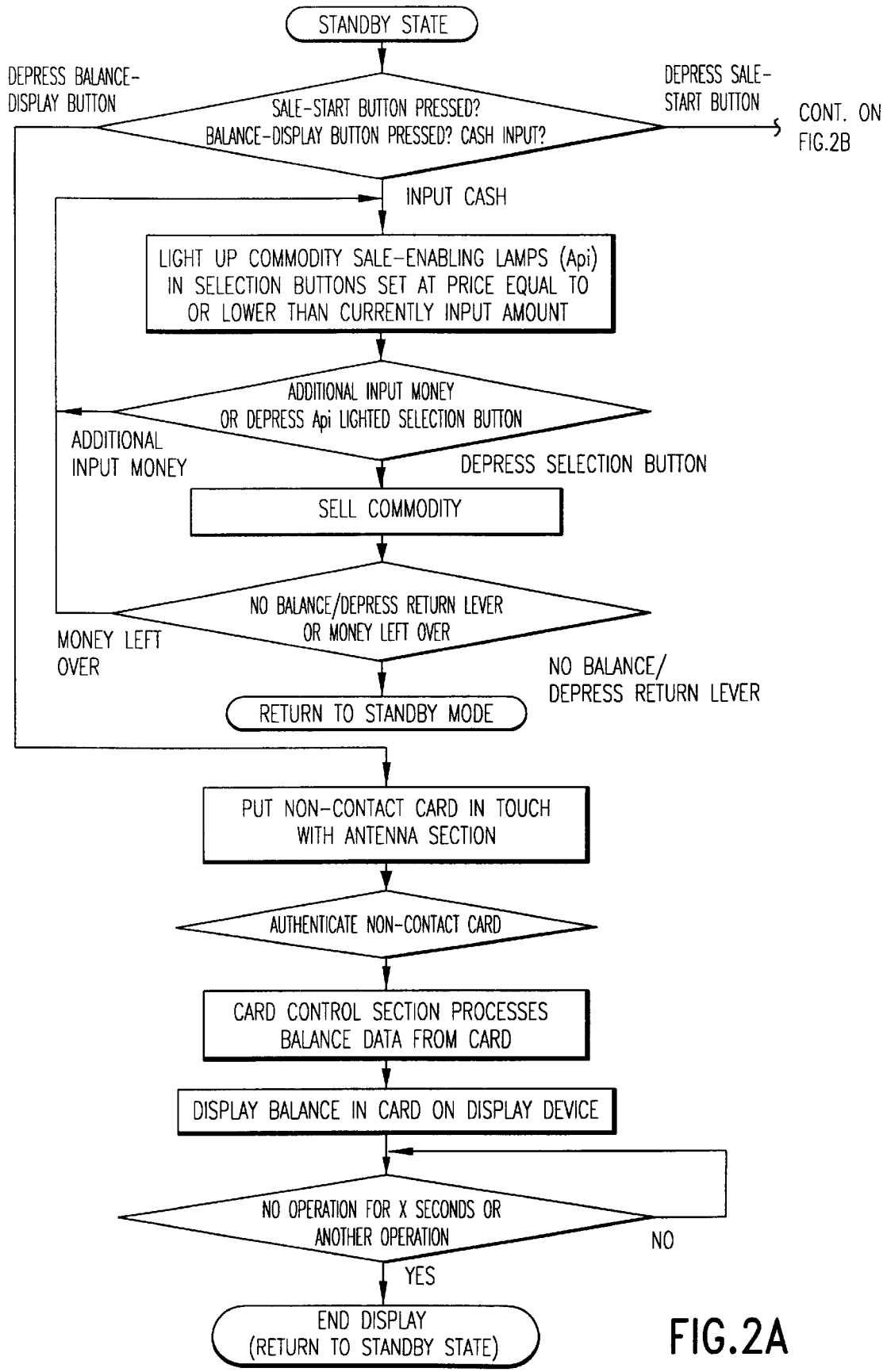
FIG. 2 is a flow chart of an operation of the embodiment in FIG. 1.
Figure 2B:
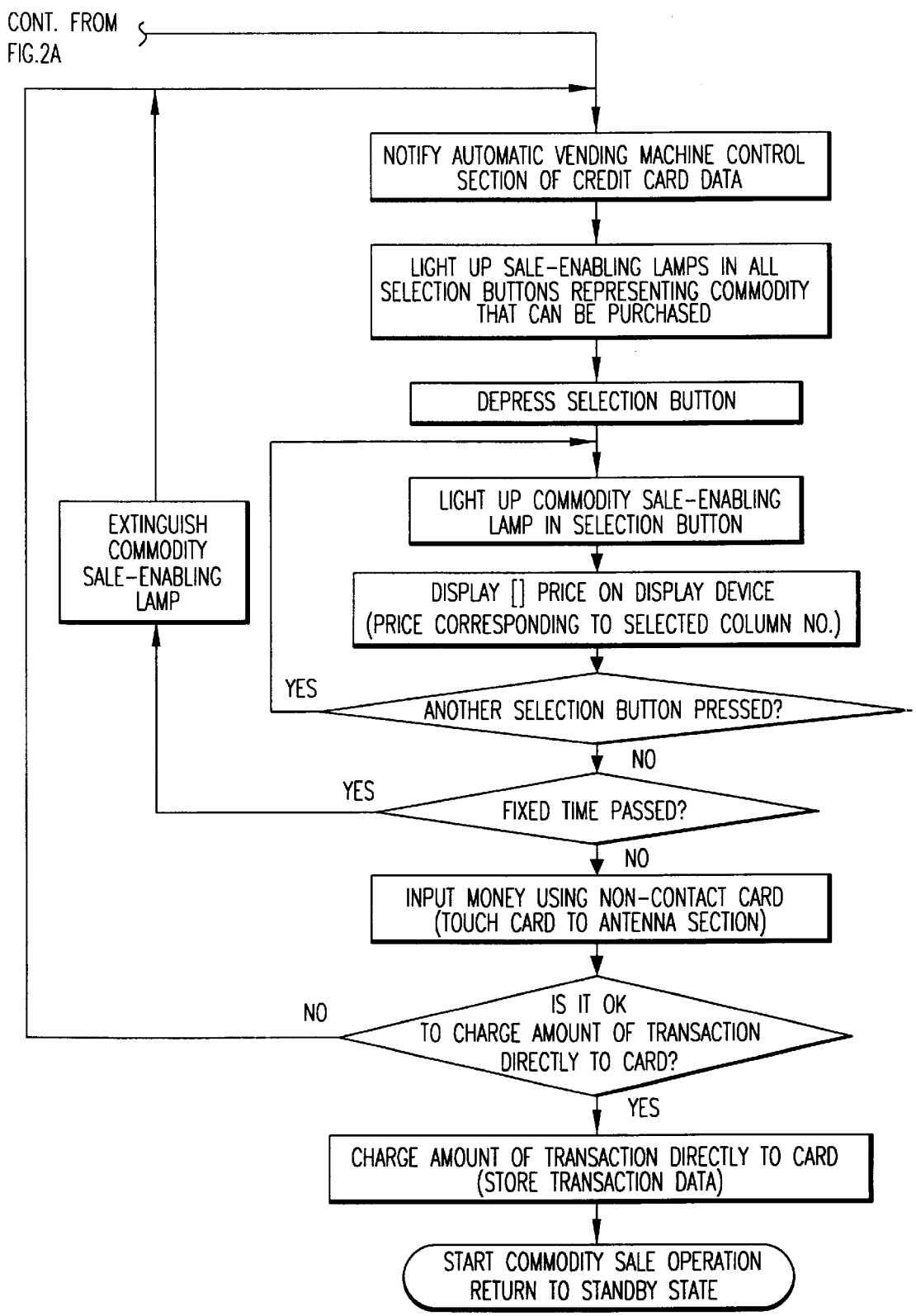

FIG. 1 is a block diagram of an example of a control device for an automatic vending machine according to the present invention. FIG. 2 is a flow chart of a transaction.

Reference numeral 1 denotes a main control section for controlling a sale operation performed by the automatic vending machine, and reference numeral 2 denotes selection buttons, each corresponding to a particular commodity and having a built-in lamp 3 for indicating that the commodity can be sold, each of the selection buttons corresponding to one of a plurality of columns 4 (No.1 to No.n) for housing corresponding commodities to be sold. The commodities in each column 4 are set at a corresponding price (A to N yens). Reference numeral 5 denotes an amount display; reference numeral 6 denotes a coin input port; 7 is a coin control section for determining whether a coin input from the coin input port 6 is authentic and transmitting money information to and from a main control section 1; 8 is a bill input port; 9 is a bill control section for determining whether a bill input from the bill input port 8 is authentic and transmitting money information to and from the main control section 1; 10 is a contact card insertion port; and 11 is a card control section for reading or writing data from or to a contact card inserted through the card insertion port 10.

Reference numeral 12 denotes a card unit for controlling a non-contact IC card, and includes an antenna section 14 for supplying power to a non-contact IC card 13 and reading or writing data from or to the non-contact IC card 13, a sale-start button 15 for activating a non-contact IC credit-card-sale mode, a balance-display button 16 for activating a mode for checking data in the card for the balance, a display 17 for displaying the amount of money subtracted upon a sale with the non-contact IC card as well as the balance, and a control section 18 for controlling each of these components. Reference numeral 19 denotes a modem for connecting the card unit 12 to a central computer 20. Reference numeral 21 denotes an arbitrary circuit network interposed between the modem 19 and the central computer 20. The control section 18 has a built-in encryption processing section 22 for executing encrypted communication with the non-contact IC card and with the central computer 20, the encryption processing section 22 being connected to the main control section 1 based on a serial communication method. Reference numeral 23 is a commodity transfer mechanism for transferring a commodity selected from each column 4 to a commodity output port 24 in response to a command from the main control section 1.

Next, a sale operation performed by the automatic vending machine according to the present invention will be described with reference to the flowchart shown in FIG. 2. The right side in this figure shows the progress of a sale with a non-contact card. In a sale-standby state, the antenna section 14 of the card unit 12 outputs no electric wave and waits for input of cash or the use of the non-contact IC card sale-start button 15 or the balance-display button 16. A user for purchasing a commodity using a non-contact IC card first presses the sales-start button 15 of the card unit 12. Upon detecting this button signal, the control section 18 of the card unit 12 causes an electric wave for a power supply to be sent to the antenna section 14 while transmitting a credit command to the main control section 1 indicating that a credit-card-sale mode has been entered. Upon receiving this command, the main control section 1 lights the sale enabling lamps 3 in the selection buttons 2 corresponding to all commodities that can be sold at that time, thereby allowing the user to input one of the commodity selection buttons. When the user selects one of the commodities and presses the corresponding commodity selection button 2, corresponding commodity selection price data is displayed on the amount display 5 and transmitted to the control section 18 of the card unit 12. Furthermore, only that sale enabling lamp 3 lights up, while the other lamps remain extinguished. If the user then desires to change the commodity selection and when the user presses another selection button for the newly desired commodity, then the sale enabling lamp in the newly selected button lights up while the sale enabling lamp in the already lighted button is extinguished, and new price data is transmitted to the control section 18 of the card unit 12. The card user then presses the sale-start button 15 and puts the card 13 in soft touch with the antenna section 14 within a fixed period of time.

In response to this operation, the control section 18 of the card unit 12 uses the built-in encryption processing section 22 to carry out mutual authentication with the card to determine whether the card meets specifications, reads amount data from the card, and uses the selected price sent from the main control section 1 to arithmetically check whether "amount in card≧selected price". If the result is affirmative, a subtraction process is executed and a commodity transfer permitting command (OK) is transmitted to the main control section 1 via a serial communication. If the result is negative, the subtraction is not executed and a commodity transfer prohibition command (NG) is transmitted to the main control section 1. The control section 18 of the card unit 12 considers this sale transaction to be a statement item to record and retain the year/month/day/hour/minute, the card ID number, the price, and other data, and transmits these data as sales data to the central computer 20 via the modem 19 and the circuit network 21 as required for data management.

The above series of operations are performed at a high speed so that the user feels that the operations are initiated and completed with one simple touch of the card. Upon receiving the commodity transfer permitting command, the main control section 1 shifts to a commodity transfer operation to drive the transfer mechanism 23 to transfer the commodity to the commodity output port 24. Upon receiving the commodity-transfer prohibition command, the main control section 1 returns to a standby state. The process returns to the standby state if the non-contact IC card is not moved closer to the antenna section 14 within a fixed period of time after the commodity selection button has been pressed.

Exactly the same operation as in the prior art is performed if coins, bills, or contact cards are used to purchase a commodity. The central line in FIG. 2 indicates the flow of a sale transaction using coins, bills, or contact cards. In this case, a commodity is transferred by pressing the commodity selection button after inputting money. For example, in the case of coin, the coin control section 7 determines whether a coin 25 input to the coin input port 6 is authentic, and if the result of the determination is affirmative, an amount signal corresponding to the amount of money input is sent to the main control section 1. Then, if the amount signal indicates a value equal to or higher than the price of the commodity contained in the selection signal, the main control section 1 transmits a sale signal to the commodity transfer mechanism 23 to start a commodity sale operation. The commodity is transferred from the selected column 4 to the commodity output port 24 to complete the sale operation. If a change is required, the main control section 1 sends change information to the coin control section 7 to output the change. If the amount of money input is smaller than the price of the selected commodity, the process returns to the money input standby state again and the display 5 displays a message stating that the amount of money input is insufficient to call the user's attention. If money is not input within a fixed period of time after the commodity has been selected, the lamp 3 in the selection button 2 for the selected commodity is extinguished and the process returns to standby.

In case a bill is input, the resulting operation is nearly identical to that described above involving coins. In the case of a contact card, a contact card 26 inserted into the card insertion port 10 is loaded in the contact card control section 11, and data stored in the card is read. If the balance in the card is equal to or higher than the price of the selected commodity, the commodity is transferred and the data in the card is rewritten before being returned.

In the contact card, it is known that a rewriting print sheet is put on a card surface and the balance is written to the sheet each time the card is used, but in the non-contact IC cards, transactions to be completed are done simply by holding the card to the machine, so that the rewriting sheet is not used. Thus, the present invention uses the balance display 17 of the card unit 12 to display the balance. The left side in FIG. 2 shows a flow of this operation. A card user first presses the balance-display button 16 of the card unit 12. Then, the control section 18 starts transmitting an electric wave for a power supply to the card. Then, when the card user puts the card 13 in soft touch with the antenna section 14, the control section 18 uses the built-in encryption processing section 22 to carry out mutual authentication with the non-contact JC card to determined whether the card meets specifications and reads amount data from the card to display it on the balance display 17 for a fixed period of time. The sale-start button 15 and the balance-display button 16 are separated to activate the corresponding modes before the non-contact IC card is touched with the antenna section 14, so that the commodity can be purchased or the balance can be checked by holding the card up to the machine once, thereby providing a reliable automatic vending machine.

Figure 3:
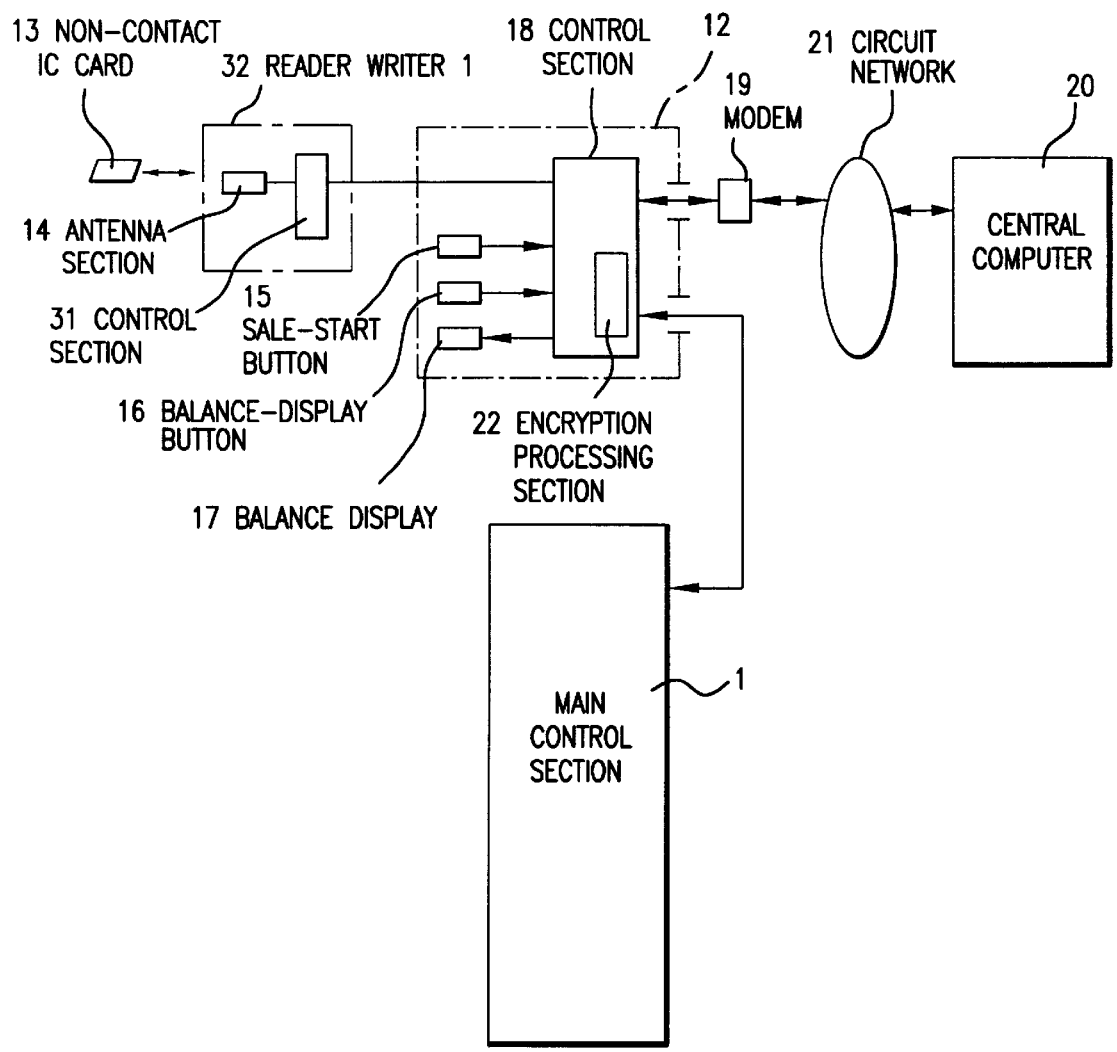
FIG. 3 is a block diagram of a different embodiment of an integral part of the present invention.

In the above-described example, the card unit 12 has the antenna section 14, the sale-start button 15, the balance-display button 16, and the balance display 17 integrated thereinto, but for example, the antenna section may have to be separated from the card unit 12 due to limited space inside the automatic vending machine. An example of such a configuration is shown in FIG. 3. The same parts as in FIG. 1 are denoted by the same reference numerals. The sale-start button 15, the balance-display button 16, the balance display 17, and the control section 18 are provided within the one card unit 12, while the antenna section 14 and a control section 31 for supplying power and writing data to the non-contact IC card are integrated into a reader writer 32. The control section 31 of the reader writer 32 is connected to the control section 18 of the card unit 12, and the control section 18 is connected to the modem 19, the circuit network 21, and the central computer 20 in the same manner as in the embodiment in FIG. 1. Encrypted communication is made between the non-contact IC card 13 and the reader writer 32, between the reader writer 32 and the card unit 12, and between the card unit 12 and the central computer 20.

The present invention provides the following effects:

(1) When the non-contact IC card is used, the mutual authentication, the comparison with the balance, and the subtraction of the selling amount are instantaneously carried out when the card is held up once to, or made in touch with a particular section of the automatic vending machine. Consequently, the present automatic vending machine is compatible with operations with the non-contact IC cards for transportation and avoids confusion for users in operations even when placed next to an automated ticket gate, to increase convenience.

(2) The electric wave for a power supply to the card is provided only when a non-contact IC card user intending to purchase a commodity operates the sale-start button. This prevents a certain amount from being inadvertently subtracted from the card, thereby improving reliability.

(3) The present invention can be applied to an automatic vending machine for selling commodities at various prices without increasing the number of antennas or adding other parts.

(4) The elements required to process the non-contact IC card are integrated into one unit and the external I/O signals comprise only the command and the selected selling price data. This prevents the card ID or the amount data from leaking, thereby minimizing the leakage of information. This in turn precludes the forgery and alteration of the card based on wire tapping to improve security. In addition, since the card unit does not always output an electric wave, eavesdropping is avoided and human bodies or other equipment are prevented from being affected by the electric wave.

(5) Since the non-contact IC card is processed by using the credit command signal that is compatible with the conventional automatic vending machines, the present invention can be applied to the existing automatic vending machines through minor modifications.

(6) Transaction data for a card settlement is stored in the single closed control unit with its occurrence time and transmitted to the central computer after being encrypted to improve the reliability of the transaction data.

(7) If the user uses cash, the same operational procedure as in the prior art—an operation including cash input and subsequent commodity selection—can be used. Consequently, cash or card only automatic vending machines are not required, thereby improving location efficiency for installation.

While the invention has been explained with reference to the specific embodiments of the invention, the explanation is illustrative and the invention is limited only by the appended claims.

What is claimed is:

1. An automatic vending machine comprising:
   commodity-selecting means for selecting a commodity to be purchased,
   means for paying money required to purchase the commodity,
   commodity-transfer means for transferring the selected commodity,
   an antenna section for communication by electric wave to allow commodities to also be purchased by a non-contact IC card,
   means for activating the card,
   means for activating a mode for displaying a balance of the card,
   a balance display for displaying the balance, and
   a main control section connected to the commodity-selecting means, means for paying cash, commodity-transfer means, antenna section, means for activating the card, means for activating the mode, and the balance display, for controlling the same.

2. An automatic vending machine according to claim 1, wherein said means for activating the card includes a sale-start button, and the means for activating the mode for displaying the balance includes a balance-display button; the antenna section, the sale-start button, the balance-display button, the balance display and a sub-control section for controlling components are configured into one card unit; and said vending machine further comprises communication means between the card unit and the main control section, said communication means including only a sale-mode-activating signal, selling amount data on a selected commodity, and a sale permission or prohibition signal acting as an operation result signal from the card.

3. An automatic vending machine according to claim 1, wherein the means for activating the card includes a sale-start button, and the means for activating the mode for displaying the balance includes a balance-display button; the sale-start button, the balance-display button, the balance display and a sub-control section for controlling components are configured into one card unit; the antenna section and a control section therefor are configured into a reader writer; and said machine further comprises communication means between the card unit and the main control section, said communication means including only a sale-mode-activating signal, selling amount data on a selected commodity, and a sale permission or prohibition signal acting as an operation result signal from the card.

4. An automatic vending machine according to claim 2, wherein said card unit includes a built-in block for a secure application module acting as an encryption processing section, said sub-control section of the card unit being able to communicate with a central computer via a communication interface, said built-in block for the secure application module communicating with the card and the central computer device.

5. An automatic vending machine according to claim 1, wherein display means for displaying the balance of the card is provided in a card unit separately from the display section of a main body of the automatic vending machine.

6. An automatic vending machine according to claim 2, wherein the sale-start button and the balance-display button are used to start supplying power to the card from the card unit through an electric wave.

7. An automatic vending machine according to claim 1, further comprising a sale-start button so that when the sale-start button is operated, one of a sequential operation comprising a first operation of commodity selection executed by the commodity-selecting means and a second operation of money payment executed by means for paying money, and a sequential operation comprising a first operation of money payment and a second operation of commodity selection, is conducted.

* * * * *